UNITED STATES PATENT OFFICE.

ERNEST WM. COOKE, OF CHICAGO, ASSIGNOR TO THE AMERICAN ROLLER BEARING COMPANY, OF WESTERN SPRINGS, ILLINOIS.

LUBRICANT.

SPECIFICATION forming part of Letters Patent No. 455,013, dated June 30, 1891.

Application filed February 21, 1890. Serial No. 341,323. (Specimens.)

*To all whom it may concern:*

Be it known that I, ERNEST WILLIAM COOKE, a citizen of the United States, and a resident of Chicago, in the county of Cook and State of Illinois, have invented a certain new and useful Lubricant, of which the following is a specification.

My composition consists of the following ingredients, combined in the proportions stated, to wit: oil, ten fluid ounces; ferro-cyanide of potassium, ten to thirty grams; powdered graphite, ten to forty grams; dextrine, three grams. These ingredients are thoroughly mixed together by any suitable means and are then ready for use. The oil employed is preferably some animal or fatty oil, although tallow may also be employed with good results.

The chief feature of my lubricant is that while it lessens the friction of the running portions of machinery it also hardens the metal surfaces with which it comes in contact.

Having thus fully described my invention, what I claim herein as new, and desire to secure by Letters Patent of the United States, is as follows:

The herein-described composition of matter to be used as a lubricant, consisting of oil, ferro-cyanide of potassium or cyanogen salts of potash, powdered graphite, and dextrine, in the proportions specified.

ERNEST WM. COOKE.

In presence of—
   H. HAUPT, Jr.,
   H. KEELER.